United States Patent [19]

Kallenbach

[11] Patent Number: 4,955,467
[45] Date of Patent: Sep. 11, 1990

[54] ENERGY DAMPING DEVICE
[75] Inventor: Ralph Kallenbach, Elgin, Ill.
[73] Assignee: Fluor Corporation, Irvine, Calif.
[21] Appl. No.: 289,362
[22] Filed: Dec. 21, 1988

Related U.S. Application Data

[63] Continuation of Ser. No. 119,084, Nov. 10, 1987, abandoned.
[51] Int. Cl.$^5$ .......................... F16F 13/00; F16F 7/00; B60T 7/12
[52] U.S. Cl. ................................... 188/381; 188/134; 267/134
[58] Field of Search ............... 267/134, 213, 214, 296, 267/207, 216, 49, 58; 188/271, 129, 67, 381, 130, 134, 136

[56] References Cited

U.S. PATENT DOCUMENTS

| | | | |
|---|---|---|---|
| 1,816,401 | 7/1931 | Rolland | 267/207 |
| 2,404,666 | 7/1946 | Snyder | 188/129 |
| 2,615,535 | 10/1952 | Snyder | 188/129 |
| 2,732,767 | 1/1956 | Herlach | 188/129 X |
| 2,747,696 | 5/1956 | Blattner | 188/129 |
| 3,009,747 | 11/1961 | Pitzer | 188/67 |
| 3,575,087 | 4/1971 | Sherwood | 188/67 X |
| 3,603,577 | 9/1971 | DeRaad | 188/129 X |
| 4,010,940 | 3/1977 | Freyler | 188/129 X |
| 4,396,096 | 8/1983 | de Groot et al. | 248/58 X |
| 4,481,974 | 11/1984 | Schmitt et al. | 188/67 X |

Primary Examiner—Robert J. Oberleitner
Attorney, Agent, or Firm—Bernard L. Kleinke; Jerry R. Potts; William P. Waters

[57] ABSTRACT

An energy damping device that includes a piston-cylinder assembly having a cylinder and a piston movable therein. A pre-loaded double acting spring, and a friction assembly, are enclosed fully within the cylinder, and engage the piston concentrically. The spring acts against the friction assembly for forcing it into frictional engagement with the inner surface of the cylinder. The friction assembly includes at least one wedge for engaging the interior surface of the cylinder. The friction assembly further includes a plurality of spaced-apart compression rings, that are interleaved with the wedges, for forcing them into radially outwardly directed frictional engagement with the interior surface of the cylinder.

16 Claims, 2 Drawing Sheets

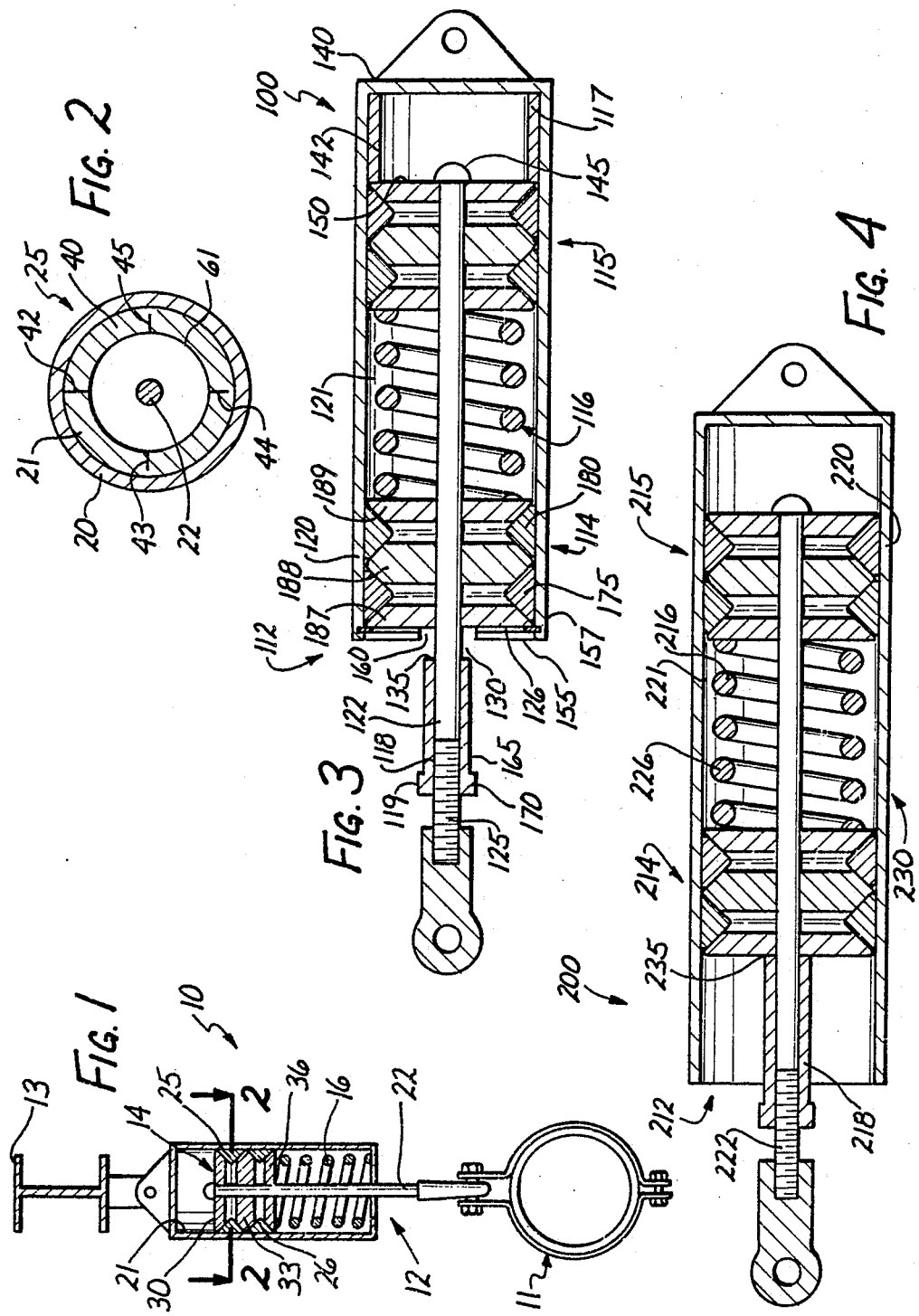

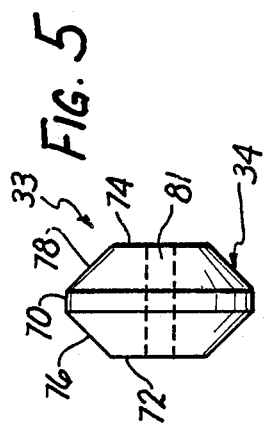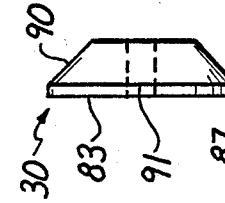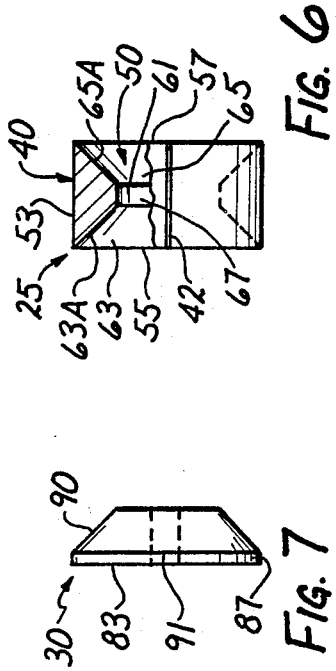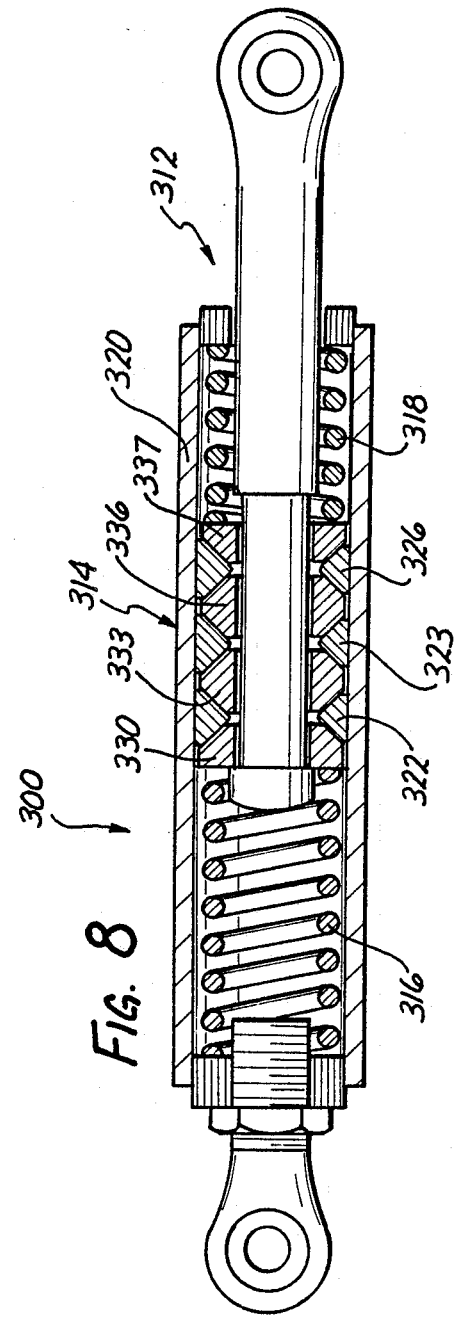

ENERGY DAMPING DEVICE

This is a Continuation, of application Ser. No. 07/119,084, filed on 11/10/87, now abandoned.

DESCRIPTION

1. Technical Field

The present invention relates in general to energy damping devices, and it relates more particularly to a system for absorbing shock loadings, for dissipating kinetic energy, for controlling vibration, and for restraining the movement of a load.

2. Background Art

Energy damping devices are well known, and have been employed widely in various industries, and for various applications. For instance, the railroad industry commonly utilizes friction wedged shock absorbing systems, for dissipating vibratory kinetic energy.

Conventional damping devices are best exemplified by the damper sold under the tradename Houdaille Friction Snubber, sold by Houdaille Industries, Inc., located in Buffalo, N.Y. The Houdaille damper generally includes a tubular barrel that houses a pre-compressed spring and three segmental shoes, for engaging frictionally the inside of the barrel, during the movement of the working elements. The pre-compressed spring forces the shoes outwardly into engagement with the barrel, for causing a thermal resistive displacement of the shoes against the inner lining of the barrel. However, the frictional displacement of the shoes causes the lining of the shoes and the barrel to wear rapidly. Thus, the conventional dampers require frequent maintenance, and replacement of parts.

While the Houdaille damper, as well as similar conventional devices absorb the kinetic energy caused by the vibratory movement of the supported system, they have proven to be less than totally satisfactory for dissipating relatively large transient kinetic energies. In this respect, the dissipation of the vibratory energy requires only a moderate frictional resistance to be generated by the thermal displacement of the moving parts, such as the shoes in the Houdaille damper. However, the dissipation of the larger transient kinetic energies causes the energy damping system to operate in an unpredictable and thus an unwanted manner. Such undesired effect is best exemplified by the "water hammer" effect, which is caused by rapid valve actuation, or by the movement or whipping effect of a broken pipe secured to such a damper, when the pipe ruptures.

Unsuccessful solutions have been attempted to overcome the problems associated with the dissipation of large transient kinetic energies. One such solution has been to increase the travel or displacement of the resistive element, such as the shoes in the Houdaille damper. Another attempted solution has been to increase the length of the spring. Although each one of the proposed solutions may cause the dissipation of relatively large transient kinetic energies, they have proven to be less than completely satisfactory. In this respect, increasing the displacement of the resistive element, or lengthening of the spring element, increases objectionably the overall size of the damping device. Thus, such attempted solutions were not entirely satisfactory for some applications, since the larger size of the damper would not permit its use in confined locations, or otherwise where space does not allow. Moreover, such attempted solutions add significantly to the manufacturing cost.

Therefore, it would be highly desirable to have a new and improved energy damping device, which is adaptable to dissipate efficiently the vibratory as well as the transient energies. The damping device should generate relatively large resisting force, with minimal displacement along a resistive path. The device should be relatively compact in size, relatively inexpensive to produce and convenient to install. It should further operate in a predictable manner, and it should require minimal maintenance, as well as replacement parts.

The device should have a wide range of modern applications, and it should be adapted for universal use, such as in the locomotive industries and nuclear power plants. The device should be sufficiently sensitive, as well as relatively light in weight and compact in size, for military and space applications.

DISCLOSURE OF INVENTION

Therefore, the principal object of the present invention is to provide a new and improved energy damping device, which is adaptable to dissipate, efficiently, vibratory as well as transient energies, by generating a relatively large resistive force, with minimal displacement along a resistive path.

A further object of the present invention is to provide a new and improved energy damping device, which is relatively small and compact in size, inexpensive to manufacture, and convenient to install.

Briefly, the above and further objects and features of the present invention are realized by providing a new and improved energy damping device that includes a piston-cylinder assembly having a cylinder and a piston movable therein. A pre-loaded double acting spring, and a friction assembly, are enclosed fully within the cylinder, and engage the piston concentrically. The spring acts against the friction assembly for forcing it into frictional engagement with the inner surface of the cylinder.

The friction assembly includes at least one wedge for engaging the interior surface of the cylinder. The friction assembly further includes a plurality of spaced-apart compression rings, that are interleaved with the wedges, for forcing them into radially outwardly directed frictional engagement with the interior surface of the cylinder.

In one form of the invention, the energy damping device includes one friction assembly, and one pre-loaded spring. Thus, when the device is subjected to vibratory shock loadings, as well as kinetic transient loadings, the resulting energy is converted into thermal energy, and is dissipated along the inner wall of the cylinder. In this regard, the spring applies an axial force to the adjacent outer compression ring, for forcing it into a tighter engagement with the next adjacent wedge. Therefore, the wedge is forced radially outwardly into frictional engagement with the inner wall of the cylinder. Similarly, depending on the magnitude of the applied force, the wedges in the friction assembly are forced into frictional engagement with the inner surface of the cylinder.

Another form of the invention includes an energy damping device having a pair of spaced-apart friction assemblies, which are oppositely disposed relative to the spring.

Yet another form of the invention features an energy damping device, which includes a pair of spaced apart friction assemblies, oppositely disposed relative to the spring, and a pair of stops, for limiting the free travel of the piston inside the cylinder, and further for limiting the travel of one of the friction assemblies therein. A gap or space is provided between one stop and the adjacent friction assembly, for allowing a limited free travel of the piston inside the cylinder. Still another form of the invention, features an energy damping device which includes a friction assembly disposed intermediate two double acting pre-loaded springs.

The inventive device is relatively small and compact in size, inexpensive to manufacture, convenient to install, and is operable in a predictable manner. It generates a relatively large resistive force along a relatively short resistive path. The inventive device is sufficiently sensitive, as well as relatively light in weight, for enabling it to be adapted to a wide range of modern applications.

BRIEF DESCRIPTION OF DRAWINGS

The above mentioned and other objects and features of this invention and the manner of attaining them will become apparent, and the invention itself will be best understood by reference to the following description of the embodiments of the invention, in conjunction with the accompanying drawings, wherein:

FIG. 1 is a sectional front elevational view of an energy damping device, which is constructed in accordance with the present invention, shown supporting a piping structure;

FIG. 2 is an enlarged sectional view of the energy damping device of FIG. 1, taken on line 2—2 thereof;

FIG. 3 is a sectional view of another energy damping device, which is constructed in accordance with the present invention;

FIG. 4 is a sectional view of yet another energy damping device, which is constructed in accordance with the present invention;

FIG. 5 is an enlarged side elevational view of an inner compression ring, which forms a part of the device of FIG. 1;

FIG. 6 is an enlarged side elevational fragmentary view of a wedge, which forms a part of the device of FIG. 1;

FIG. 7 is an enlarged side elevational view of an outer compression ring, which forms a part of the device of FIG. 1; and FIG. 8 is a sectional view of yet another energy device, which is constructed in accordance with the present invention.

BEST MODE FOR CARRYING OUT THE INVENTION

Referring now to the drawings, and more particularly to FIG. 1 thereof, there is shown an energy damping device 10 which is constructed in accordance with the present invention, and which is shown attached to a high pressure piping system 11. The device 10 controls the vibration, and restrains the movement of the piping system 11 in the event of a rupture, as it will be described hereinafter in greater detail.

The device 10 generally includes a piston cylinder assembly 12, having a cylinder 20 which has one of its ends anchored to a substantially immovable rigid support structure 13, and has its opposite end connected to the piping system 11, for helping support it. A pre-loaded double acting spring 16 is housed inside the piston cylinder assembly 12, for acting axially against a friction assembly 14.

The friction assembly 14 generally includes a group of substantially similar spaced-apart wedges, such as the wedges 25 and 26 which are disposed alternately, intermediate a group of compression rings, such as the compression rings 30, 33 and 36. For illustration purposes only, the friction assembly 14 is equipped with two wedges, and three compression rings. However, it will become apparent to those skilled in the art, that more than that number of wedges and compression rings may be used in a single device 10.

The friction assembly 14 engages the piston 22 of the cylinder assembly 12 concentrically, and further engages the inside wall or periphery 21 of the cylinder 20 of the cylinder assembly 12 snugly and frictionally. Thus, the movement of the friction assembly 14 against the inner wall 21 at the cylinder 20, develops a resistive frictional force for converting the kinetic energy of the system into thermal energy, which in turn is dissipated through the walls of the piston cylinder assembly 12.

As illustrated in FIG. 6, the wedge 25 generally includes an annular member 40 which defines a central opening 50, for engaging concurrently, a pair of complementary shaped compression rings 30 and 33. As further illustrated in FIG. 2, the wedge 25 also includes an axially-extending slit-like opening 42 in the periphery thereof for enabling the wedge 25 to extend radially outwardly into frictional engagement with the inner wall 21 of the cylinder 20 when the compression rings 30 and 33 are forced inwardly inside the central opening 50. Thus, the wedge 25 is adapted to dissipate vibratory as well as transient kinetic energies. In this respect, when the energy being absorbed increases, the wedge 25 is caused to extend adjustably into tighter frictional engagement with the inner wall 21, for dissipating a greater amount of energy.

In operation, the device 10 is subjected to vibratory shock loadings, as well as possible transient kinetic loadings. The resulting energy is converted into thermal energy, and is dissipated along the inner wall 21 of the cylinder 20. In this regard, when the piping system 11 is subjected to an upward force, the piston 22 of the piston cylinder assembly 12 moves upwardly inside the cylinder 20. The pre-loaded spring 16 then applies an axial upward force to the lower compression ring 36, which is generally similar in construction and design to the upper compression ring 30, as illustrated in FIG. 7.

The spring 16 forces the compression ring 36 into a tighter engagement with the wedge 26, for causing the wedge 26 to move axially, and to extend radially outwardly into frictional engagement with the inner wall 21 of the cylinder 20. The axial displacement of the wedge 26 forces it into engagement with one of the sloping annular cam surfaces 78 of the next adjacent compression ring 33. The other oppositely symmetrically disposed sloping annular cam surface 76 of the compression ring 33, is caused to move axially into engagement with the next adjacent wedge 25, for forcing it to move concurrently in an axial direction, as well as in a radial direction.

The axial displacement of the wedge 25 forces it into engagement with the compression ring 30. The cam surface 76 of the compression ring 33 engages a complementary shaped sloping annular cam surface 65A of the wedge 25 for camming it radially outwardly. In so doing, the opening 42 is caused to be spread apart peripherally and the wedge 25 is forced into frictional engagement with the inner wall 21 of the cylinder 20.

When the device 10 is subjected to a downward force, the piston 22 is forced axially, downwardly, inside the cylinder 20, for causing the upper compression ring 30 into engagement with first wedge 25, in order to force it radially outwardly into frictional engagement with the inner wall 21 of the cylinder 20. Thus, if the downward force exceeds the axial frictional resistance of the wedge 25, the wedge 25 is forced into axial engagement with the shoulder 76 of the compression ring 33, for causing the other shoulder 78 into axial engagement with the next adjacent wedge 26.

Such axial engagement of the compression ring 33 with the wedge 26 causes the wedge 26 to extend radially outwardly into frictional engagement with the inner wall 21 of the cylinder 20. If the downward axial force still exceeds the frictional resistance developed by the wedges 25 and 26, the entire friction assembly 14 is caused to compress the spring 16 downwardly.

Thus, the inventive combination of the friction assembly 14 and the spring 16 increases the loading capability of the device 10. It has been found experimentally that a friction assembly 14 which includes three wedges, and four compression rings, increases the loading capability of the device 10 by about five times the loading capability of the spring 16 alone. Therefore, the present inventive friction assembly reduces substantially the overall length and cost of the device 10, and increases enormously its range of application.

Considering now the friction assembly 14 in greater detail, with particular reference to FIGS. 1, 2, and 5-7 of the drawings, it generally includes a series of spaced-apart compression rings 30, 33 and 36, and a group of wedges 25 and 26 interleaved therewith. The wedges 25 and 26 are generally similar to one another, and therefore only the wedge 25 will be described hereinafter in greater detail.

The wedge 25 generally comprises an annular split ring member 40, which is hollow throughout its axial length. The annular member 40 has a centrally disposed, axially extending generally hour-glass configured opening or bore 50. The opening 50 defines the inwardly tapered sloping cam surface or shoulder 65A, as well as an oppositely disposed inwardly tapered sloping cam surface or shoulder 63A. The outside diameter of the internal cam surface or edge 63A, decreases axially progressively toward a central annular portion 61, for defining a conically shaped portion or spacing 63 of the opening 50.

Similarly, the outside diameter of the internal cam surface 65A decreases axially progressively toward the central annular portion 61, for defining a conically shaped portion or spacing 65 of the opening 50. The opening portion 65 defines a tapered shoulder or edge 65A. The spacing 65 is generally symmetrical to the spacing 63 relative to the radial axis of symmetry of the wedge 55. The central annular portion 61 is generally circular in cross section, and defines an annular spacing 67, intermediate the conical spacings 63 and 65.

As illustrated in FIG. 2, the annular member 40 of the wedge 25 generally includes a slit-like radial opening 42 which extends throughout its axial length and radial thickness, for enabling the annular member 40 to move radially outwardly into engagement with the wall 21 of the cylinder 20, when a compression ring, such as the compression ring 33 engages the annular shoulder 53. A plurality of generally similar slit-like radial openings, such as the openings 43, 44, and 45, are substantially spaced-apart axially along the periphery of the annular member 40. The opening 43, 44 and 45 generally extend radially from the central annular portion 61 through substantially, but not entirely, the radial thickness of the annular member 40. Thus, the openings 43, 44, and 45 enable the annular member 40 to deform hingedly thereon, and to facilitate its outward radial engagement with the inner wall 21.

Considering now the compression rings 30, 33 and 36 in greater detail, with particular reference to FIGS. 1, 5 and 7, the friction assembly 14 generally includes one pair of outer compression rings 30 and 36, and one inner compression ring 33. However, it will become apparent to those skilled in the art, that one or more similar inner compression rings can be used.

The inner compression ring 33 includes an annular body 34, having an enlarged increased diameter portion 70, which is generally circular in cross-section, and which is positioned intermediate the outer end portions 72 and 74. The sloping annular cam surfaces or shoulders 76 and 78 are disposed symmetrically at either side of the enlarged portion 70. The cam surface 76 is complementary shaped and dimensioned to engage the cam surface 65A. The cam surface 76 extends outwardly from the enlarged portion 70, and has an outside diameter that decreases axially progressively toward the distal end portion 72.

Similarly, the cam surface 78 is complementary shaped and dimensioned to engage an inclined edge (not shown) of the internal annular shoulder (not shown) of the adjacently disposed wedge 26. The cam surface 78 extends outwardly from the enlarged portion 70, and has an outside diameter which decreases axially progressively toward the distal end portion 74. An elongated central cylindrically shaped opening 81 extends throughout the entire axial length of the inner compression ring 33, for engaging concentrically the piston 22 of the piston-cylinder assembly 12, and for moving slidingly freely along its axial length.

The outer compression rings 30 and 36 are generally similar in design and construction, and therefore, only the compression ring 30 will be described hereinafter in greater detail, with particular reference to FIG. 7. The compression ring 30 includes an annular body 83, having an enlarged increased diameter portion 87, which is generally circular in cross-section. An annular inclined cam surface or edge 90 is generally similar in shape and dimensions to the inclined shoulder 76 of the inner compression ring 33, for engaging the cam surface 63A. An elongated central cylindrical opening 91 extends throughout the axial length of the outer compression ring 30, for engaging concentrically the piston 12, and for moving slidingly and freely along its axial length. The opening 91 has generally a similar diameter to the opening 81, and has about one half its axial length.

Considering now another energy damping device 100 which is constructed in accordance with the present invention, in greater detail with reference to FIG. 3 of the drawings, it is generally similar to the energy damping device 10. The device 100 includes a piston-cylinder assembly 112, for enclosing fully a pre-loaded spring 116, and a pair of friction assemblies 114 and 115 therein.

The piston cylinder assembly 112 is generally similar to the piston-cylinder assembly 12 of the energy damping device 10, and includes an elongated cylinder 120, which is hollow throughout its axial length, and which is similar to the cylinder 20. An elongated rod-like piston 122 is similar to the piston 22, and engages the cylinder 120 axially, and further engages the spring 116 and the friction assemblies 114 and 115 concentrically.

The piston-cylinder assembly 112 differs from the piston-cylinder assembly 12, in that it includes two stops 117 and 118, for limiting the movement of the spring 116 and the friction assemblies 114 and 115 inside the cylinder 120. In this regard, the stop 118 includes an elongated tubular nut-like body 165, which is hollow throughout its entire axial length, and which is adapted to be secured threadably and adjustably to the outer end 125 of the piston 122.

The stop 118 can be positioned selectively axially along the piston 122, at a distance from the proximate end 126 of the friction assembly 114, for defining a gap 130 therebetween, in order to allow a limited free travel of the piston 122, prior to engaging the friction assembly 114. Thus, when relatively small loadings cause a vibratory displacement of the piston 122 inside the cylinder 120, the front end 135 of the body 165 abuts the friction assembly 114, and the forward movement of the piston 122 is therefore limited.

The stop 117 is encased fully inside the cylinder 120, at the proximate end 140 thereof, and abuts the friction assembly 115, for limiting its forward movement inside the cylinder 120. The stop 117 is formed of a tubular member 142, which is hollow throughout its entire axial length, and which is complementary sized relative to the inner wall or periphery 121 of the cylinder 120, for engaging it snugly.

Considering now the spring 116, it is generally similar to the spring 16 of the device 10, in design and construction, and it is mounted concentrically on the piston 122 inside the cylinder 120. The spring 116 is disposed intermediate the friction assemblies 114 and 115, for causing the device 110 to dissipate the excess energy when the piston 122 moves axially inside the cylinder 120. Thus, when the piston 122 is forced forwardly inside the cylinder 120, the forward end 135 of the stop 118 abuts the friction assembly 114, and drives it forwardly and frictionally along the inner wall 121, for causing the energy to be dissipated thereby. The movement of the friction assembly 115 during the forward travel of the piston 122 remains restricted by the stop 117.

Similarly, when the piston 122 is forced rearwardly outside the cylinder 120, a cap 145 which is disposed at the distal forward end 150 of the piston 122, abuts the friction assembly 115, and forces it rearwardly and frictionally along the inner wall 121 for causing the energy to be dissipated thereby. The movement of the friction assembly 114 during the rearward travel of the piston 122 remains restricted by a generally circular plate 155 at the proximate end 157 of the cylinder 120.

A plate 155 is generally affixed to the cylinder 120, at its proximate end 157, for abutting the friction assembly 114, and to encase the spring 116 and the friction assemblies 114 and 115 inside the cylinder 120. The plate 155 includes a circular opening 160 which is complementary shaped and dimensioned relative to the outside diameter of the stop 118, for allowing the body 165 of the stop 118 to engage and to project inside the cylinder 120 through the opening 160. The body 165 extends rearwardly integrally into an annular head 170, having a larger outside diameter than that of the body 165, and that of the opening 160. Thus, when the stop 118 is moved forwardly along with the piston 122, the head 170 abuts the plate 155, and its travel inside the cylinder 120 is limited thereby.

Considering now the friction assemblies 114 and 115 in greater detail, they are generally shown for illustration purposes, as being similarly configured. Therefore, only the friction assembly 114 will be described hereinafter in greater detail. It will become apparent to those skilled in the art, after reviewing the present disclosure of the invention, that the friction assemblies could also be configured differently from one another, depending on the nature of the application of the device 100.

The friction assembly 114 is generally similar to the friction assembly 14 of the damping device 10, and it includes a group of substantially similar spaced-apart wedges, such as the wedges 175 and 180, which are similar in design and construction to the wedges 25 and 26. A group of compression rings such as the compression rings 187, 188 and 189 are interleaved with the wedges 175 and 180, and are similar to the compression rings 30, 33 and 36 respectively.

Considering now another energy damping device 200 which is constructed in accordance with the present invention, in greater detail, with particular reference to FIG. 4 of the drawings, it is generally similar to the energy damping device 110. The device 200 includes a piston-cylinder assembly 212, which is generally similar to the piston-cylinder assembly 112, for encasing a preloaded spring 216, and a pair of friction assemblies 124 and 125 therein.

The piston-cylinder assembly 212 is generally similar to the piston-cylinder assembly 112, with the exception that it does not include a stop similar to the stop 117. Furthermore, the piston-cylinder assembly 212 includes a stop 218, which is similar to the stop 118, with the exception that the front end 235 thereof, abuts continuously the friction assembly 214. Thus, when the piston 222 of the piston-cylinder assembly 212 is forced to move, whether inwardly or outwardly relative to the cylinder 220, the entire cluster 230 formed of the two friction assemblies 214 and 215, and the intermediate spring 226, to move frictionally along the inner wall 221 of the cylinder 220, in the direction of the applied force. The length of the spring 216 does not change, and therefore, the resistive force applied thereon is constant.

Considering now another energy damping device 300 which is constructed in accordance with the present invention, in greater detail with particular reference to FIG. 8 of the drawings, it is generally similar to the energy damping device 200. The energy damping device 300 includes a piston-cylinder assembly 312, which is generally similar to the piston-cylinder assembly 212. The piston-cylinder assembly 312 further includes a cylinder 320 for encasing one friction assembly 314 therein.

The friction assembly 314 is generally similar to the friction assembly 214 of the device 200. For illustration purposes only, the friction assembly 314 is shown including a series of three wedges, 322, 323 and 326, which are generally similar to the wedge 25, described in connection with the device 10. The friction assembly 314 is also shown to include a series of four compression rings 330, 333, 336 and 337, disposed in an interleaving arrangement relative to the wedges 322, 323, and 326. The outer compression rings 330 and 337, are generally similar in design and construction to the outer compression ring 30 of the device 10. The inner compression ring 333 and 336 are generally similar to the compression ring 33 of the device 10. A pair of pre-loaded double action springs 316 and 318 are disposed inside the cylinder 320, one on each side of the friction assembly 314.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An energy damping device, comprising:
   a piston cylinder assembly including a hollow cylinder and a piston mounted at least partially within said hollow cylinder;
   a friction assembly acting forcibly between said cylinder and said piston for developing resistive frictional forces therebetween to dissipate large loads exerted axially on said cylinder and said piston relative to one another;
   means for mounting said piston and said cylinder to be freely movable axially relative to one another independently of said friction assembly to permit small loads to move said cylinder and said piston relative to one another axially during normal operation;
   wherein said means for mounting includes means defining an opening extending axially within said friction assembly for receiving freely and uninhibitedly said piston;
   said piston including an enlarged portion extending radially therefrom at a position external of said friction assembly;
   means for limiting the free axial relative movement of said cylinder and said piston relative to one another by engaging said enlarged portion of said piston;
   means cooperating with said mounting means and said limiting means for defining a space;
   said space permitting the limited substantially free relative travel of said piston prior to engaging said friction assembly without developing substantial resistive frictional forces under small loads during said normal operation; and
   spring means acting against said friction assembly to urge it resistively for permitting said limited substantially free relative travel without causing substantial resistive frictional forces by said friction assembly responsive to said small loads only, and for biasing said friction assembly to cause said frictional forces to be developed responsive to said large loads only.

2. An energy damping device according to claim 1, further including a second friction assembly disposed opposite the first friction assembly relative to said spring means.

3. An energy damping device according to claim 1, further including second spring means for exerting biasing forces resiliently on said friction assembly in an axial direction opposite to the first mentioned spring means.

4. An energy damping device according to claim 1, wherein said piston-cylinder assembly includes a friction absorbing surface and said friction assembly includes at least one wedge for engaging said friction absorbing surface and a plurality of spaced-apart compression rings, said wedge and said compression rings being interleaved to facilitate the movement of the wedge into outward radial frictional engagement with said friction absorbing surface.

5. An energy damping device according to claim 4, wherein said spaced-apart compression rings includes a pair of outer compression rings, one at each end of the friction assembly.

6. An energy damping device according to claim 5, wherein said spaced-apart compression rings further includes at least one inner compression ring.

7. An energy damping device according to claim 6, wherein said wedge includes an annular member being hollow throughout its entire axial length.

8. A friction assembly according to claim 4, wherein said spaced-apart compression rings include a pair of outer compression rings, one at each end of the friction assembly.

9. A friction assembly according to claim 8, wherein said spaced-apart compression rings further includes at least one inner compression ring.

10. An energy damping device according to claim 4, wherein said wedge includes at least one axial slit-like opening.

11. An energy damping device according to claim 2, further including stop means for engaging at least one of said friction assemblies, said stop means being disposed on said piston for permitting said friction assemblies to remain at a fixed spaced apart distance therebetween.

12. An energy damping device according to claim 11, wherein said stop means is adapted to cause said spring means to assume a given fixed length.

13. An energy damping device, comprising:
   a piston cylinder assembly including a hollow cylinder and a piston mounted within said hollow cylinder;
   a friction assembly acting forcibly between said cylinder and said piston for developing resistive frictional forces therebetween to dissipate large loads exerted axially on said cylinder and said piston relative to one another;
   means for mounting said piston and said cylinder to be freely movable axially relative to one another independently of said friction assembly to permit small loads to move said cylinder and said piston relative to one another axially during normal operation;
   means for limiting the free axial relative movement of said cylinder and said piston under small loads during said normal operation;
   means cooperating with said mounting means and said limiting means for defining a space to allow the limited substantially free relative travel of said cylinder and said piston without said friction assembly developing substantial relative frictional forces;
   spring means acting against said friction assembly to urge it resiliently for permitting said limited substantially free relative travel without causing substantial resistive frictional forces by said friction assembly responsive to said small loads only, and for biasing said friction assembly to cause said frictional forces to be developed responsive to said large loads only;
   said piston cylinder assembly including a friction absorbing surface and said friction assembly including at least one wedge for engaging said friction absorbing surface and a plurality of spaced-apart compression rings, said wedge and said compression rings being interleaved to facilitate the movement of the wedge into outward radial frictional engagement with said friction absorbing surface;

said spaced-apart compression rings including a pair of outer compression rings, one at each end of the friction assembly;

said spaced-apart compression rings further including at least one inner compression ring;

said wedge including an annular member being hollow throughout its entire axial length; and said annular member defining an internal generally hourglass configured opening.

14. An energy damping device according to claim 13, wherein said hour-glass opening is defined by a centrally disposed annular portion, and two conically shaped annular cam surfaces for engaging the compression rings, being disposed symmetrically on either side of said annular portion, and wherein the outside diameter of each of said annular cam surfaces decreases progressively toward said central annular portion.

15. An energy damping device according to claim 14, wherein one of said outer compression rings includes an annular body having an enlarged portion being generally circular in cross-section; and wherein said annular body further includes an annular inclined cam surface that is complementary shaped to one of said cam surfaces of said wedge, and said annular cam surface of said annular body decreases progressively axially outwardly for engaging frictionally one of said cam surfaces of said annular wedge.

16. An energy damping device according to claim 15, wherein said inner compression ring includes an annular body being hollow throughout its entire axial length, and having a centrally disposed enlarged increased diameter portion, said enlarged portion being equally circular in cross-section; and wherein said annular body further includes two conically shaped annular cam surfaces that are disposed symmetrically on either one of said increased diameter portion, the outside diameter of each of said annular cam surface increases progressively axially toward said enlarged diameter portion, for engaging the respective adjacent wedges.

* * * * *